United States Patent [19]

Sachs

[11] 4,137,198
[45] Jan. 30, 1979

[54] POLYMER-INORGANIC FOAM

[76] Inventor: Carrol C. Sachs, 14721 Lull St., Van Nuys, Calif. 91405

[21] Appl. No.: 412,333

[22] Filed: Nov. 2, 1973

Related U.S. Application Data

[63] Continuation-in-part of Ser. No. 84,943, Oct. 28, 1970, Pat. No. 3,775,351.

[51] Int. Cl.² .................................................. C08J 9/30
[52] U.S. Cl. ................................. 521/154; 260/29.6 S; 260/29.7 S; 260/37 M; 260/38; 260/39 M; 260/39 P; 260/39 R; 260/42.3; 260/42.41; 260/42.49; 521/83
[58] Field of Search .................. 260/29.7 S, 29.6 S, 260/2.5 F, 2.5 L, 2.5 S

[56] References Cited

U.S. PATENT DOCUMENTS

| | | | |
|---|---|---|---|
| 2,273,367 | 2/1942 | Meyer | 260/2.5 F |
| 2,442,321 | 5/1948 | Cuppett | 260/2.5 F |
| 2,536,375 | 1/1951 | Koehn | 260/29.6 S |
| 2,576,955 | 12/1951 | Ludwig | 260/29.6 S |
| 2,581,295 | 1/1952 | Redfarm | 260/29.6 S |
| 2,664,406 | 12/1953 | Armstrong | 260/2.5 F |
| 2,733,995 | 2/1956 | Robinson | 260/29.6 S |
| 3,043,790 | 7/1962 | Sanders | 260/29.6 S |
| 3,228,905 | 1/1966 | Talalay et al. | 260/2.5 L |
| 3,256,229 | 6/1966 | Janota et al. | 260/29.6 S |
| 3,298,973 | 1/1967 | Quarles et al. | 260/2.5 F |
| 3,389,094 | 6/1968 | D'Alessandro | 260/2.5 F |
| 3,483,156 | 12/1969 | Mills, Jr. et al. | 260/29.6 S |
| 3,748,290 | 7/1973 | Reingen | 260/2.5 F |
| 3,819,565 | 6/1974 | Yasima et al. | 260/29.7 S |
| 3,822,229 | 7/1974 | McMaster | 260/29.7 S |

*Primary Examiner*—Morton Foelak
*Attorney, Agent, or Firm*—Max Geldin

[57] ABSTRACT

Polymer-inorganic hybrid foam, having utility as construction materials, comprised of a continuous plastic phase or backbone structure of unexpanded polymer, e.g. polyvinyl acetate, vinyl-acrylic copolymer or asphalt or bituminous pitch, having distributed therein particles of an inorganic phase such as Portland cement particles, such inorganic phase being substantially free of sand, rock or aggregate, the cells of the hybrid foam being highly uniform, such hybrid foam being strong, and load supporting, and of low density, and being fire resistant and thermally insulating.

19 Claims, No Drawings

POLYMER-INORGANIC FOAM

This application is a continuation-in-part of my copending application Ser. No. 84,943, filed Oct. 28, 1970, now Pat. No. 3,775,351.

This invention relates to production of novel high strength and low density construction materials, particularly designed for formation into panels and other structural shapes for general construction purposes, and is particularly concerned with production of a polymer-inorganic hybrid foam product or construction material, which in addition to being strong and lightweight, is load supporting, fire resistant, and thermally insulating, and having particular utility for the construction of wall, floor and roof panels, both for commercial and residential construction.

There has developed in recent years particularly for use in residential construction as well as in commercial building construction a need for new construction materials especially suitable for use in the form of large panels for wall, floor and roof construction, which have good strength characteristics, comparable to panels formed from cement or gypsum, but which are of much lower density so as to permit, for example, prefabrication of building constructions at a factory site, and transporting of such prefabricated structures to the building site. In addition, the construction materials or panels are required to have good thermal insulation and high fire resistance, and particularly such construction materials are required to be produced at reduced costs compared to comparable dense cement and gypsum panels, with their high labor demand, presently employed.

Sefton U.S. Pat. No. 3,272,765 is directed to a lightweight concrete comprising closed cell expanded polymer particles such as expanded polystyrene beads, a binder of hydraulic cement and a surface-active additive such as alkyl aryl sulfonates, such surface-active additive being present in the final product. The patentee also incorporates air-entraining synergist in the form of certain hydrocarbons to augment the air-entraining action of the surface-active additive. The concrete composition of this patent has a substantially continuous phase of aerated concrete with an aggregate of expanded polystyrene beads dispersed in the concrete phase. The resulting concrete although of relatively low density, has a relatively low strength, for example a compressive strength of the order of about 400 psi, and is only capable of supporting light loads. Further, the fire resistance of the concrete composition of the above patent is not considered satisfactory, since when such composition is subjected to elevated temperature, e.g. of the order of about 250° F., distortion and contraction of the polystyrene beads occur, particularly in the exposed surface of the concrete, and when subjected to fire exposure conditions at flame temperatures the exposed expanded plastic, e.g. polystyrene, beads in the surface of the concrete matrix ignite and burn with a very smoky flame. In addition, such concrete composition lacks high thermal resistance. The concrete composition of the above patent also has an undesirable heterogeneous surface texture, particularly where the expanded plastic, e.g. polystyrene, beads are exposed.

However, according to the present invention, there is produced a polymer-inorganic hybrid foam which is lightweight, yet which has substantially greater compressive strength than that of the above patent composition, and is load supporting and can be used as a construction material for production of wall, floor or roof panels in construction of buildings and homes. In addition, the composition of the present invention is highly fire resistant, has high thermal insulation characteristics and has smooth surface characteristics, that is, it is self-skinning.

The polymer-inorganic hybrid foam of the invention consists essentially of a plastic phase in the form of a matrix or backbone of a suitable polymer as hereinafter defined, e.g. polyvinyl acetate, vinyl-acrylic copolymer, or an asphalt or bituminous pitch, and an inorganic phase formed of particles thereof, e.g. Portland cement or gypsum, and which is substantially free of sand, rock or aggregate, substantially uniformly distributed through the continuous plastic or polymer phase, the cells of the resulting polymer-inorganic cellular hybrid foam, formed essentially from the plastic matrix or phase, being highly uniform, with the particles of the inorganic phase substantially uniformly distributed throughout such cells.

In contrast to the concrete composition of the above patent, the polymer-inorganic hybrid foam of the present invention does not employ expanded polymer particles such as polystyrene beads, but rather utilizes unexpanded polymer or resin particles. These polymer or resin particles are initially in emulsion form, but coalesce to form a continuous phase forming the cell walls in the final hybrid foam product, the particles of the inorganic phase being distributed in such cell walls. In addition, the present invention does not require addition of a surface-active additive as an essential component as in the above patent composition. Further, the cellular hybrid foam of the present invention is produced by a process described hereinafter, which is distinct from that of the above patent. The result is the production, in accordance with the present invention, of a polymer-inorganic cellular hybrid foam of low density, but which has substantially higher compressive strength than the concrete composition of the above patent, and is load supporting, and having high fire resistance, good thermal insulating characteristics and low thermal expansion, superior to the concrete composition of the above patent.

The improved polymer-inorganic hybrid foam composition of the invention is produced by a process which comprises providing an aqueous resin emulsion capable of being air whipped, whipping air into the resin emulsion and establishing a pre-foam of polymer or resin emulsion bubbles capable of supporting particles of an inorganic phase in the surface of said bubbles, adding an inorganic phase selected from the group consisting of cement and gypsum, in the form of particles, gradually to said air whipped resin emulsion and suspending said inorganic particles in said pre-foam, that is in the walls of said bubbles, without precipitating out said particles, and hardening said inorganic phase to set the resulting hybrid foam of inorganic particles and resin.

According to the process for producing the hybrid foam of the present invention, air is whipped into the resin emulsion prior to addition of any cement thereto. The cement or gypsum particles then gradually added to the whipped foam tend to deposit and remain in the bubble walls of the resin foam which enhances the stabilization of the foam. This is necessary in order to obtain the strong lightweight homogeneous foam product of the invention, and wherein the plastic bubbles form the cells of the final hybrid foam composition, with the cement or gypsum particles uniformly distributed therein.

A further feature of the present invention is that when employing cement according to this invention, only cement powder is used, and no sand is present, such sand being present in cement grout, and also no rock or aggregate is incorporated in the cement employed in making the foam.

A still further feature of the invention is that fiberglass roving can be introduced into the polymer-cement or polymer-gypsum hybrid foams of the invention, to reinforce such hybrid foams, and such reinforced foams can be stored over long periods of time without any evidence of fiber degradation. This permits the use of such fiberglass roving reinforcement having lightweight reinforcing characteristics in the invention foam.

As previously noted, a basic feature of the process is the establishment of the polymer-emulsion system into a pre-foam, preferably of known or predetermined composition and density, such foam consisting of thick-walled resin emulsion bubbles capable of supporting large amounts of the inorganic phase, e.g., Portland cement or gypsum powders, which are subsequently vibrated onto the surface of the foam and thoroughly mixed therewith.

To achieve such pre-foam, air is whipped into any type of resinous emulsion which is capable of being air whipped, and which is capable when so air whipped to maintain the inorganic phase particles in suspension therein. By the term "whipping air" or "air whipped" as employed herein is meant rapidly agitating the resin emulsion in the presence of air or while forcing or bubbling air into the mixture. Thus, the aqueous resin emulsion can be agitated in a tank open to the ambient atmosphere, or the resin emulsion can be agitated, with compressed air simultaneously forced or bubbled through the resin emulsion, e.g., as in a high shear single pass continuous mixer.

Of a large number of synthetic resin emulsions tested, it has been found that polyvinyl acetate emulsions are particularly suitable. Other aqueous emulsion polymer systems found satisfactory are vinyl-acrylic copolymer such as vinyl acetate-acrylic and vinyl chloride-acrylic copolymers, acrylic homopolymer, such as acrylonitrile polymer, vinylidene chloride polymer, butadiene copolymers and homopolymers such as butadiene-acrylonitrile-styrene, butadiene-styrene and polybutadiene, and silicone resins. Also, mixtures of the above polymers or resins in aqueous emulsions also can be employed, such as an aqueous emulsion of a mixture of about 75% vinyl acetate and about 25% vinylidene chloride based on the polymer phase. These polymers or resins are present in the aqueous emulsions usually in the fully polymerized state. However, where such resins are in the partially polymerized or B-stage, curing agents, polymerization initiators, and the like, well known in the art, can be added just prior to use, to effect final cure of the resin during the subsequent setting of the inorganic phase, e.g., cement.

Although the above exemplary resin emulsions are thermoplastic resin emulsions, thermosetting resin emulsions such as phenolic, e.g., phenol-formaldehyde, urea, e.g., urea-formaldehyde, and melamine, e.g., melamine-formaldehyde resin emulsions can be employed. Also, thermoplastic resins which are cross-linked in situ by x-ray or radioactive radiation, or thermally with peroxides added, can be employed.

It has also been found that relatively inexpensive natural polymers such as asphalt and bituminous pitch, the latter including coal tar and petroleum pitch, in emulsion form, can be effectively employed alternatively to the above-noted synthetic polymer emulsions. The resultant hybrid foams produced employing these naturally occurring polymers have properties comparable to those possessed by the hybrid foams obtained employing synthetic polymer emulsions.

Additionally, auxiliary components can also be incorporated into the aqueous resin emulsion to enhance the properties thereof, for example, viscosity stabilizers, such as xanthate gums, accelerators such as triethanolamine, thickeners such as methyl cellulose, carboxy methyl cellulose, and the like. Where one of the preferred resin emulsions, aqueous polyvinyl acetate emulsion, is employed, polyvinyl alcohol in small amounts, e.g., about 5 to 10 percent by weight of the emulsion, can be added to aid in maintaining the polyvinyl acetate in suspension and to enhance the bonding strength of the resin and to confer on the resulting hybrid foam construction superior toughness, particularly in the case of the production of a polymer-inorganic hybrid cement foam according to the invention, without adversely affecting any other advantageous properties of such foam.

Although commercially available aqueous resin emulsions of the types noted above may contain small amounts of surface active agents, it is preferred for reasons noted hereinafter to avoid the presence of surface-active agents in the process for producing the hybrid foam hereof. This is contrary to the patent above, wherein a surface-active additive is incorporated as an essential component of the concrete composition of the patent. Specific examples of resin emulsions which are essentially free of surface-active agents or emulsifiers are the acrylonitrile, polybutadiene, butadiene-acrylonitrile-styrene and butadiene-styrene resin emulsions marketed as "Hycar" emulsions by B. F. Goodrich Company.

The aqueous resin emulsion should contain sufficient water to permit the emulsion to be air whipped in a short period of time into a foam which can be maintained stabilized during the subsequent addition of the inorganic phase particles, the pour time and the initial setting time. For this purpose, for example, the aqueous resin emulsion can contain from about 10 to about 60 percent resin solids by weight, the remainder being water. When desired, water can be added initially to a commercially available resin emulsion to achieve desired dilution of resin or polymer in the aqueous emulsion.

The aqueous resin emulsion is air whipped to establish a pre-foam which preferably has a predetermined or certain volumetric expansion in relation to the volume of the original emulsion. Thus, the initial aqueous resin emulsion can be air whipped from about 1 to about 10 times, usually about 2 to 6 times, its initial volume. Thus, for example, an initial aqueous resin emulsion which has a density of 8.4 pounds/ft$^3$ and a viscosity of 10 cps (centipoises) at 25° C. can be whipped to an air entrained foam having a density of about 1 to about 2 pounds/ft$^3$, in from about 2 to about 10 minutes. This can be accomplished in a device as simple as a mixmaster equipped with standard beaters or wire whips.

When the initial aqueous resin emulsion has been air whipped to produce the desired volumetric expansion of foam, the inorganic phase in the form of particles of, e.g., Portland cement, gypsum, or a mixture thereof, and which is substantially free of sand, rock or aggregate, is gradually added to the aqueous polymer emulsion pre-foam under conditions to maintain the foam stable and without reducing the hybrid foam volume inordinately below the volume of the pre-foam. Ideally the rate of addition of the cement or gypsum to the air whipped pre-foam is such as to maintain the foam volume substantially constant. The preferred flow stream of the inorganic particulate matter is in the form of a thin film, e.g. fed from the edge of a vibrating hopper. Cement particles can be employed in admixture with a minor amount of gypsum, e.g., about 1 to about 25% of the total inorganic, by weight.

If the inorganic particles are added to the pre-foam too rapidly or in too thick a stream, e.g., in the form of lumps, then particles of the inorganic phase tend to precipitate or form on the bottom of the vessel. Of particular significance in the present invention, no gravel or sand is employed. Usually it requires only a few minutes, e.g., about 1 to 2 minutes, to add the cement to the pre-foam. Addition of the inorganic phase particles, e.g., cement or gypsum powder, or a combination thereof, gradually to the air whipped pre-foam as noted above, forms a thin film of such inorganic particles in and/or on the surface of the foam bubbles or cells, and at the intersections between the bubbles, but not in the center of the bubbles, to form a lightweight material. The surface tension and film thickness and strength characteristics of the polymer emulsion when air whipped to bubble form are important factors in the ability of the bubble or cell wall to support a large amount of inorganic powder loading. It has been found from experience that the presence or addition of wetting agents generally decreases the surface tension of the emulsion polymer cell wall, with consequent thinning of the cell wall, and while the initial foam head may be higher upon whipping with air into foam, the resulting foam height and stability of the foam upon addition of the inorganic phase to the system generally is reduced. Further, for example ammonia or simple amines tend to inhibit the crystalization of gypsum systems, causing slow setting, and hence should be avoided in such systems. The gypsum or cement powders appear to act as protective colloids which enhance the stabilization of the bubble structure when suspended within the bubble wall.

It has been found that if the inorganic phase, e.g., cement or gypsum, is added to a resin emulsion such as those noted above, which have not been previously air whipped, the inorganic particles are not suspended in the bubble walls according to the invention concept, but rather tend to nucleate or agglomerate and migrate into the interior of the bubbles formed on mixing following addition of the inorganic phase, and the resultant foam construction following setting does not possess the low density, cell uniformity and high strength characteristics of the hybrid foam construction of the present invention.

It is of interest that most industrial aqueous emulsions are prepared so as to minimize foaming during processing, which proves troublesome, e.g., when vats run over, etc. In some cases minute quantities of silicone anti-foaming agents are added to control this foaming tendency during mixing, pumping, etc. One of the features of this invention is the discovery that nonetheless such emulsion can be successfully emulsified with air by proper beating to form stable re-foams.

As previously noted, a relatively large amount of inorganic particles can be suspended in the manner noted above in the aqueous resin emulsion. Thus, for example, from about 300 to about 1,000 parts of inorganic particles such as cement or gypsum powder can be supported in an aqueous resin emulsion pre-foam of the types noted above, such as a polyvinyl acetate, asphalt or bituminous pitch emulsion, containing about 50 to about 100 parts of resin solids and about 400 to 700 parts of water, by weight. In such aqueous resin emulsions it is noted that hot water may be substituted for cold water, such hot water tending to accelerate the subsequent set of the cement or gypsum. Likewise where extended set times are required for setting, cold or refrigerated water can be used.

It has been found that when employing, for example, polyvinyl acetate aqueous emulsion, such emulsion, for example, will support from 400 to 800 grams cement or gypsum loading of an aqueous resin emulsion containing only 50 parts resin solids and 400 parts water, with relatively little decrease in initial volume in the 400 to 500-gram loading, and less than 50 percent decrease in overall emulsion volume occurs with an 800-gram loading. The higher the inorganic phase loading, generally the greater the density of the resulting foam. It has been found that some systems actually increase in volume with the addition of the inorganic powder, e.g., cement or gypsum, showing that the inorganic particulate matter is truly suspended in the bubble cell walls and not congragating in the interbubble interface or migrating into the center of the bubble, thus increasing the volume of the system.

As a further feature it has been found that the addition of iron oxide ($Fe_2O_3$) to the inorganic or cement particles appears to improve the surface hardness of the resulting hybrid foam compositions. Also, the incorporation of such iron oxide into the inorganic particles colors the hybrid foam composition to a brick-like color.

Further, it has been found that the addition of carbon, e.g. in the form of carbon powder, either with or without iron oxide, to the inorganic or cement particles, prior to incorporation thereof into the whipped aqueous resin emulsion, results in a hybrid foam composition according to the invention having exceptional fire resistance, and rendering such hybrid foam composition suitable for fire resistant roofs, fire walls and fire door cores.

If desired, the iron oxide and/or the carbon, in the form of carbon powder, can be aded separately to the whipped aqueous resin emulsion, as well as in admixture with the inorganic or cement particles. The amount of the iron oxide incorporated into the air whipped aqueous emulsion containing the inorganic phase, can range from about 1 to about 50 parts of iron oxide to about 600 parts of inorganic phase or cement particles, by weight, and the amount of carbon, e.g. in the form of carbon powder, incorporated into such air whipped mixture also can range from about 1 to about 50 parts, per 600 parts of inorganic phase or cement particles, by weight.

The resulting pre-foam formed of aqueous resin emulsion having the inorganic particles, and optionally iron oxide and/or carbon powder, suspended therein preferably is poured into prepared molds and allowed to set. The initial set time for the pre-foam should be sufficient to form a solid mass which although not fully cured, is selfsupporting and which is capable of being removed from the molds. Such initial set time is generally of the order of 10 to about 60 minutes, usually about 20 to 30 minutes. A shorter set time for example of the order of about 10 minutes can be sufficient when a continuous casting process is employed. Thus, the process of the invention, involving rapid setting time is particularly adapted to continuous casting of products, as for example between movable belts.

Since it is generally well recognized that the way to retard the set of gypsum or Portland cement is to add a small percentage of organics thereto, it is particularly unexpected and surprising that for example, as much as 100 parts of resin solids can be tolerated in only 600 parts of gypsum or cement and still achieve an initial set according to the invention of say only 10 to 30 minutes.

The molds for the initial setting of the hybrid foam containing the inorganic particles can incorporate plastic or rubber liners. Following the initial set as described above for a period such that the resulting molded parts have a consistency so that such parts are handleable, the parts re removed from the tool or mold, usually with the above-noted plastic or rubber films attached to the parts, and such films can be peeled off either immediately or after a subsequent additional or final curing of the parts.

The period for additional or final setting of the hybrid foam can range, for example, from as little as about 4 hours up to 30 days. If gypsum is employed in the pre-foam, this additional period of setting is essentially a drying operation to remove excess water. When using Portland cement, a much slower hydration occurs which at room temperature may take a period of days, e.g., about 15 to about 30 days.

For example, when employing Type V (low sulfate sea water proof) cement in a polyvinyl acetate aqueous emulsion, this additional setting after demolding can be accomplished according to the following schedule, dependent upon the temperature of setting, with the following hardness values obtained.

| °F | Cure Condition | Set Time | Rockwell "R" Hardness |
|---|---|---|---|
| 75 | Moist Air | 5 days | 0 |
| 75 | Moist Air | 28 days | 60-70 |
| 160 | Dry No Pressure Steam | 17 hours | 80-85 |
| 200 | Dry No Pressure Steam | 6 hours | 80-100 |

As previously noted, either cement, such as Portland cement, alone, or gypsum alone, can be employed as the inorganic phase of the pre-foam resin emulsion. Where gypsum alone is employed, the resulting structural foam produced is not water-proof, whereas when employing Portland cement alone, that is gypsum-free cement, the resulting hybrid foam construction is water-proof and possesses a closed cell structure which is buoyant. In some cases it is advantageous to employ gypsum in admixture with Portland cement. Thus, the inorganic phase can be comprised of gypsum and about 0 to about 25% of Portland cement by weight of total inorganics. Where cement with a small amount of gypsum is employed, such gypsum provides an inhibiting action in setting of the inorganic phase system. The preferred cement composition is one which is gypsum-free, permitting greately accelerated initial sets even in the presence of substantial amounts of organics, e.g., polyvinyl acetate.

As previously noted, the resulting polymer-inorganic hybrid foam produced according to the invention process has substantially lower density than corresponding cement structures produced according to the prior art, and is of a ecllular nature yet has good strength and is load supporting, with the additional advantages of being both thermally insulating and fire resistant. Cement hybrid foam articles produced according to the invention floated in water several months without sinking or apparent softening. Gypsum hybrid foams, although softening in water, regain their entire strength upon redrying. However, if a water-repellant gypsum hybrid foam is desired, the outer surface of articles thus produced should be covered with a suitable coating such as a silicone water repellant, and/or any organic film forming protective coating. The proportions of inorganic phase and polymer particles in the hybrid foam product are the same as those noted above which are present in the aqueous pre-foam. The density of the polymer or resin-inorganic hybrid foam produced herein can range from about 10 to about 80 pounds/cu.ft., usually about 15 to about 45 pounds/cu.ft., compressive strength of form about 400 to about 2,000 psi and Rockwell "R" hardness from about 80 to about 125, depending upon the particular organic components employed, the setting schedule and particularly the relative proportions of inorganic to organic components utilized. Such foam is fire resistant and thermally insulating, with a "K factor", e.g., ranging from about 0.15 to about 0.5. The relative proportion or ratio of inorganic components in the final hybrid foam construction can range from about 300 to about 1,000 parts of inorganic, that is cement or gypsum constituents, to about 50 to about 100 parts of resin solids, by weight.

Tapered density hybrid foam structures such as panels and beams, e.g., for use in a cantilevered roof, can be made according to the invention by varying the organic-inorganics ration, e.g., in a continuous process.

Although applicant does not know the nature of the reaction occurring or the relation between the polymer and the inorganic phase, e.g., cement particles, as result of the setting of the hybrid foam, it is believed that a bonding action takes place between the polymer or resin and inorganic phase which in conjunction with the incorporation of the inorganic phase into an air whipped emulsion of the polymer or resin, results in production of both a lightweight and relatively high strength solid foam material, andthe inorganic particles are substantially uniformly distributed throughout the plastic or polymer phase matrix of the cellular foam structure, the cells of which are highly uniform.

It is noted that the hybrid foam product is not merely a suspension of inorganic particulate matter in the polymer cell or bubble wall as a filler, but rather it is believed that a reaction occurs forming intersticial compounds or complexes between the inorganic phase, i.e. Portland cement or gypsum, and the polymer emulsion phase. This is demonstrated (1) by a sequestering or ion exchange which reduces the alkalinity of the hybrid foam and (2) by the observation that the hybrid foam adheres to or fails to separate from a large variety of commercial polymer separators used in releasing the set foam from the mold. Such hybrid foams even adhere to Teflon (polytetrafluoroethylene) and other fluorinated films, which would ordinarily readily separate from the resin phase. Also, the hybrid foam adheres to all concrete separators, which would ordinarily separate from the concrete phase, indicating some synergistic reaction between the polymer and inorganic phases.

The characteristics of typical polymer-inorganic hybrid foam constructions produced according to the invention employing cement and gypsum, respectively, are as follows:

| Properties | Cement | Gypsum |
| --- | --- | --- |
| Density (lbs/ft$^3$) | 43.31 | 37.32 |
| Compressive Strength (lbs/in$^2$) | 997 | 792 |
| Modulus | $18.1 \times 10^5$ | $7.5 \times 10^5$ |
| Flexural Strength (psi) | 1440 | 1036.4 |
| Resistance to Water | Excellent | Poor |
| Chemical Resistance | Good | Good |
| Insulating Property (K Factor) BTU/in. | .35 | .28 |
| Rockwell Hardness "R" | 109 | 90 |

The use of fiberglass fabrics and roving have in the past proved unsuitable as reinforcement for concrete or gypsum. When employed in conventional Portland or gypsum cement structures, within a few days following setting of the cement, the fiberglass reinforcement loses its strength, as a result of alkaline chemical attack, destroying the surface of the fiber and hence its strength. A relatively heavy vinyl acetate finish on roving has proved somewhat satisfactory in gypsum drywall products but unsatisfactory for Portland cement. Thus, for example, due to this alkalinity phenomenon, fiberglass roving cannot be incorporated successfully into the concrete of the above Sefton patent.

An additional feature, according to the invention, is that fiberglass roving can be incorporated or introduced into the polymer-Portland cement or polymer-gypsum hybrid foams according to the invention, to form reinforced hybrid foams having excellent strength between both types of hybrid foams and the fiberglass roving, without evidence of degradation of the fiberglass over extended periods when cured at room temperature. There is believed to be an immunizing or sequestering effect of the resin emulsion-cement or gypsum foam composition of the invention against the alkaline nature of both gypsum and Portland cement. This avoids the presence of active alkali in the composition when the composition is poured over the roving in the mold. Although such mechanism of immunization of the hybrid foam composition against the destructive chemical effects of gypsum or Portland cement on fiber glass is not clearly understood, its effect is, however, clearly apparent. Some samples of fiberglass roving reinforced hybrid foams have been stored for periods of months with no evidence of decrease in strength in the foam casting or its fiberglass reinforcement. The present development accordingly permits the use of fiberglass roving reinforcement rather than welded steel mesh, with a specific gravity ratio of 2.6 for the fiberglass roving as against 6.5 for the steel mesh. An additional advantage is that the terminal projections of the fiberglass roving outside the perimeter of a wall, roof or floor structure composed of the polymer-inorganic hybrid foam containing fiberglass roving according to the invention is entirely limp, which simplifies packaging, shipping and handling when compared to stiff, welded wire reinforcements normally employed.

However, where the polymer-cement foams of the invention are cured at elevated temperature, e.g., of the order of about 200° F. in a dry steam atmosphere such curing conditions tend to decompose the fiberglass roving reinforcement. This can be overcome by coating the fiberglass roving with resins and/or asphalt, thereby protecting the fiberglass roving during the final cure.

Where fiberglass reinforcement is employed, for example, 20 or 60 end fiberglass roving can be woven into the mold cavity as the preformed reinforcement, e.g., on 1 inch centers in both directions and parallel to both surfaces of the mold and as near such surfaces as practical from the esthetic standpoint. Other synthetic materials such as dacron, nylon, rayon, and the like, can be employed as reinforcement, in place of fiberglass. Wire mesh either welded or unwelded can also be employed as reinforcement.

Additional advantageous characteristics of the polymer-inorganic foam construction of the invention are as follows. Following coating and curing or setting of such foam construction it has been found that the construction is self-skinning, that is a "smooth skin" is formed on the surfaces, whereas prior art, e.g., air entrained, concrete, such as that of the above Pat. No. 3,272,765, is not self-skinning. Further, it has been found that shrinkage of the final cured coating is unusually low, for example in a 4 inch X 4 foot X 4 foot hybrid polymer-gypsum foam hollow wall casting, the total final shrinkage was 1/32 inches in the 4 ft. length. A plaster casting of similar dimensions shrinks about an inch in such 4 ft. length. Such low shrinkage permits the hybrid foam construction hereof to be cast in the form of panels 40 to 60 ft. long with very low shrinkage and without compensation for shrinkage. In addition, the bubbles formed in the hybrid foam structure, as result of the above described process for producing such foam, function to stop crack formation, and in many cases a local hole can be chopped through a panel without cracking. Also, thermal expansion of the hybrid polymer-inorganic foam is extremely low, e.g., of the order of $1 \times 10^{-8}$ inch/inch/° F. This property largely accounts for the excellent freeze-thaw and thermal shock characteristics of the invention foam construction, and permits large panels of such material to function with no requirement for thermal expansion joints, as is required in present technology.

The main utility of the polymer-inorganic hybrid foam construction materials of the invention is in the construction of wall, floor and roof panels for commercial and residential construction. Other uses include office partitions; fire-barrier doors which are light and easy to handle; polymer-cement ties similar to railroad ties for the support of Arctic pipelines, rail and truck roads and buildings, since the foam material of the invention is inherently buoyant and non-burning and non-rotting; expendable cores for filament wound fiberglass pipes and tanks, which are left in these items; buoyancy materials such as floats, piers and saftey buoys; boat and ship hulls; floating airports, beams, trusses and girders for long roof spans; modular precast bridges, earthquake resistant structures, cabinets, artificial lumber for shelving, carved panels cast as assemblies, light weight medical casts and the like.

The following are examples of practice of the invention, all parts being expressed in terms of parts by weight unless otherwise indicated.

EXAMPLE 1

A resin emulsion was provided by adding to 400 parts water, 75 parts of a 45% aqueous emulsion of polyvinyl acetate, 25 parts of a 45% aqueous emulsion of vinyl acetate-acrylic copolymer and 0.2 parts triethanolamine. The resulting aqueous resin emulsion in an open vessel was air whipped by means of a mixmaster type device equipped with standard beaters to aerate the polymer emulsion formulation noted above, in a manner similar to whipping egg whites.

When the emulsion was whipped to about 5 times the volume of the original emulsion, taking about 2 or 3 minutes, 600 parts by weight of Portland cement powder was introduced onto the surface of the pre-foam using an electric vibrator to advance the powder down a chute and allowing it to freefall onto the surface of the pre-foam while the latter was being vigorously agitated. Addition of the cement powder took place over a period of about 2 minutes.

The resulting hybrid foam mixture having the particles of cement powder suspended therein was poured into a mold or casting cell. In about 10 minutes the consistency of the foam in the mold was sufficiently rigid to be self-supporting, although not hard.

Following such initial set, the article was removed from the mold, and the resulting molded article permitted to set over a period of 28 days at ambient temperature to form the finally cured polymer-inorganic hybrid foam construction material. The cure could be accelerated to about 6 hours by placing the article in a steam bath at 200° F. and ambient pressure. Final drying can be accomplished by oven drying at temperatures from 200–300° F.

The resulting solid foam material had a density of about 37 pounds per cu. ft., was strong and load supporting.

EXAMPLE 2

Test Panel 3227 (See Table A)

A prefoam was prepared by air whipping 500 c.c. $SRM_4$ (see Table A below) containing an additional 2 c.c. triethanol amine for $3\frac{1}{2}$ minutes. The prefoam had an initial volume of 3060 c.c. 600 grams of Victor cement was next vibrated onto the surface of the prefoam. After addition of the Victor Portland cement to the surface of the prefoam bubbles, the final volume was 1560 c.c. The set time was 10 minutes and the resulting density was 30 lbs./cubic ft.

It was observed that the polymer-hybrid foam composition of this example was "self-skinning," that is, had a smooth skin on its outer surface, closely reproducing the smoothness of the mold surface. Upon fracturing the polymer-hybrid foam composition of this example, it was observed that the polymer-hybrid foam composition had a polymer phase forming a cellular foam structure, the cells of which were highly uniform, with the cement particles distributed uniformly in the cell walls.

The polymer-hybrid foam composition was subjected to compression testing, using a conventional Baldwin universal testing machine. A 1 1inch thick by 2 inches square block of the composition was subjected to compression loading, the load being increased until the yield point was reached. At this point the specimen exhibited some plastic flow without bellying laterally. The volume accordingly decreased, thus increasing the density. At this point no cracks appeared. During this initial loading operation, the height or thickness of the block decreased to 0.75 inch, with an increase in density to about 40 lbs./cubic foot. Additional compressive loading was carried out on the block until a second yield point was reached, at which time the thickness of the block had decreased to about $\frac{1}{2}$ inch with a corresponding increase in density to about 55 lbs./-cubic foot. Further compression loading resulted in third and fourth yield points, still without shear cracks or specimen failure. After four successive yield points were reached, the block was compressed to a thickness of only 0.25 inch, with a corresponding density of about 68 lbs./-cubic foot. Each time that further densification occurred after a yield point was reached, the specimen was able to carry higher unit loads.

It was accordingly observed that under the above compression loading conditions, there was no catastrophic failure, but rather plastic flow through successive yield points, showing the capability of the polymer-hybrid foam composition of the invention to carry high loads and hence is load supporting, as described herein above. When embodied in an actual structure, the hybrid foam composition of this example would provide adequate warning of any possible failure by passage through the above-noted yield points.

The polymer-inorganic hybrid foam composition of this example was placed in an air circulated oven and withstood heating temperatures of 300°–400° F. without deleterious effects on the composition.

A block of polymer-hybrid foam composition of this example was subjected to high temperature combustion conditions at flame temperatures of 1800° F. to 2000° F. in a gas fired combustion chamber. It was observed that the surface of the polymer-hybrid foam composition developed infrared reflective chromophores from decomposition of the hybrid foam, which acted as mirrors, reflecting the infrared rays from the surface of the composition back to the source of the flame. The resulting composition exhibited a low thermal expansion, of the order of $1 \times 10^{-8}$ in./in./° F., and showed very few cracks in the structure while under exposure to the flame. Those cracks which did appear did not extend beyond the area which was in direct contact with the flame. Also, the polymer-hybrid foam composition yielded a cellular structure having very low thermal conductivity. As a result the back side or that side which was unexposed to the flame rose only very slowly in temperature. Only a relatively small amount of smoke was observed during such flame exposure of the composition.

The above tests showed that the hybrid foam composition of this example has a unique internal and external structure, different from the prior art such as that of the above patent, has a high compressive strength, rendering it strongly load supporting, has high fire resistance and a low thermal expansion permitting casting of large panels without requiring thermal expansion joints, and has high thermal insulation properties.

EXAMPLE 3

Test Panel 3231 (See Table A)

500 c.c. of $SRM_4$ (see Table A below) was placed in a one gallon can and 600 grams of Victor Portland cement was summarily dumped into the liquid in a single motion. This non-homogeneous mixture was next stirred to the consistency of a uniform slurry, then air whipped as in the previous Example 2, without first preparing a prefoam.

The initial volume of the slurry was 870 c.c. A final foam volume of 1200 c.c. was achieved after beating for the extended period of 15 minutes. However, the pour continued to lose volume during the setting period by air bubbles breaking at the top surface, leaving large nonhomogeneous cells at the upper surface and an imperfect outer skin. By comparison, the pour in Example 2 (Panel 3227) remained creamy at the surface and there was no evidence of bubbles bursting or coalescing at the top surface, and the outer skin was perfect.

EXAMPLE 4

Test Panel 3232 (See Table A)

A prefoam was prepared according to the invention by air whipping for 3½ minutes 600 c.c. of polyvinyl acetate resin emulsion mixture (see Table A below). The prefoam had an initial volume of 3060 c.c 700 grams of gypsum was vibrated onto the surface of the prefoam, requiring about 3½ minutes for this operation. The final volume of the prefoam was 1410 c.c. The set time was 15 minutes and no further reduction in volume occurred during setting. The final density was 32.8 lbs./cu.ft. The cell structure was small and uniform and the outer skins were smooth and perfect.

EXAMPLE 5

Test Panel 3233 (See Table A)

A slurry was prepared by stirring 600 c.c. of polyvinyl acetate resin emulsion mixture and 700 grams of gypsum. Thereafter the slurry was air whipped for 15 minutes as compared to 3½ minutes in the prefoam method, finally resulting in a volume of 970 c.c. Air bubbles of irregular size were present in the skin surface of the foam, and many large bubbles segregated to the top surface of the casting during the 20 minutes set time. The final density was very high, i.e., 53.15 as against the 32.87 for the hybrid foam structure produced according to the invention in Example 4.

The formulations, process conditions, and physical characteristics of the articles produced according to Examples 2 to 5 are set forth in Table A below.

81-900 is a polyvinyl acetate emulsion containing 55% solids having a particle size of 1 to 3 microns, and a density of 9.2 pounds per gallon.

81-900* is 81-900 containing 5% polyvinyl alcohol by weight.

6302 is a cross-linking acrylic resin emulsion containing 45.5% solids, a particle size of 0.2 micron, and a density of 8.9 to 9.0 pounds per gallon.

TEA is triethanolamine.

T-1 is sodium carboxymethyl cellulose.

T-4 is methocel in water (10% conc).

Victor Cement is Type 1 Portland cement derived from low sulfate rock, and substantially gypsum-free.

Gypsum is 20 minute set Green Label casting plaster.

From the above table it is seen that by practice of the procedure according to the invention as described in Examples 2 and 4 above for producing panels 3227 and 3232, respectively, aereation time for preparation of the resin prefoam was very short, only about 3 minutes, to produce a prefoam volume more than four times the volume of the initial resin emulsion, and following addition of the cement or gypsum to the prefoam, volume of the resulting hybrid foam was still more than twice the volume of the resin emulsion, and after a 10 or 15 minute set time, the cement hybrid foam construction had relatively high compressive strength and hardness with relatively low density and excellent cell uniformity. On the other hand where the cement or gypsum is added first and the resulting non-homogeneous mixture is then stirred and air whipped, according to the procedure of Examples 3 and 5 for producing panels 3231 and 3233, respectively, even after air whipping for 15 minutes as compared to about 3 minutes in Examples 2 and 4, the resulting foam volume of the mixture is substantially

TABLE A

HYBRID FOAM COMPARISON PREFOAM vs PREMIX FOLLOWED BY FOAMING AEREATION

| Panel Number | Liquid Phase | Solid Hardness | Aereation Time | Prefoam Volume C.C. | Hybrid Foam Volume | Set Time | Rockwell "R" Harndess | Compressive Strength PSI | Density lb/cu.ft. | Cell Uniformity |
|---|---|---|---|---|---|---|---|---|---|---|
| 3227 (Ex. 2) | 500cc SRM₄, 2cc TEA | 600 g. Victor Cement | 3-½ min. | 3060 Pre-Foam | 1560cc | 10 Min. | 107 | 830 | 30.11 | Excellent |
| COMMENT: PREFOAM & ADD PARTICULATE MATTER (PORTLAND CEMENT WITH VIBRATOR) |
| 3231 (Ex. 3) | 500cc SRM₄, 2cc TEA | 600 g. Victor Cement | 15 min. | 870 No Pre-Foam | 1200cc | 17 Min. | 111 | 600 | 48.67 | Poor |
| COMMENT: LOW VOLUME AEREATED AFTER MIXING CEMENT & RESIN EMULSION |
| 3232 (Ex. 4) | 400cc Water, 200cc 81-900*, 1 tsp. T-4 | 700 g. Gypsum | 3-½ min. | 3060 | 1410cc | 15 Min. | 92 | 405 | 32.87 | Excellent |
| COMMENT: PREFOAM & ADD GYPSUM WITH VIBRATOR |
| 3233 (Ex. 5) | 400cc Water, 200cc 81-900*, 1 tsp. T-4 | 700 g. Gypsum | 15 min. | 870 No Pre-Foam | 970cc | 20 Min. | 117 | 1,590 | 53.15 | Poor |
| COMMENT: SLURRY, LOW VOLUME AEREATED AFTER MIXING GYPSUM & RESIN EMULSION |

In above Table A, SRM₄ formulation is:

| Components | cc |
|---|---|
| Water | 8,000 |
| 81-900 | 1,500 |
| 6302 | 500 |
| T-1 | 20 |
| TEA | 4 | less than the corresponding volumes of prefoam in Examples 2 and 4 according to the invention principles, and after a set time longer than in Examples 2 and 4, the resulting panels had a substantially higher density than the hybrid foam panels of Examples 2 and 4, together with poor cell uniformity.

EXAMPLE 6

Substantially the procedure of Example 1 was carried out except that 50 parts gypsum was added to the original emulsion prior to art whipping thereof.

The presence of the gypsum in the emulsion tended to inhibit the rate of cure, and the time for initial setting in the mold at ambient temperature was increased to about 12 hours.

The resulting construction material had substantially the same properties as that produced in Example 1, and although containing a minor portion of gypsum, still had an essentially closed cell structure and was essentially water impermeable.

EXAMPLE 7

The procedure of Example 1 was substantially followed except that the 600 parts of Portland cement powder was replaced by 700 parts gypsum powder.

The period for initial set of the air whipped foam containing the suspended gypsum particles was extended to about 60 minutes, and the period for final cure was about 5 days at ambient temperature.

The resulting polymer-inorganic hybrid foam construction had a density of about 35 pounds per cu. ft., and had a fine open cell structure but was not waterproof. This construction material was rendered waterproof by coating the surfaces of the material with any organic surface coating and/or treatment with a reactive silicone water proofing agent.

EXAMPLE 8

| Components | Weight (grams) |
|---|---|
| Resin A | 81 |
| Resin B | 26 |
| Carboxy Methyl Cellulose | 0.003 |
| Triethanolamine | 0.2 |
| Water | 400 |

Resin A was a 55% polyvinyl acetate resin emulsion.
Resin B was a 45% cross-linking acrylic resin emulsion.

550 parts of the above resin emulsion mixture was placed in an open tank and the contents of the tank air whipped by a mixer mechanism similar to Example 1 to produce a prefoam having a volume of about 5 times that of the initial resin emulsion.

1,060 parts of Victor cement powder (gypsum-free Portland cement) was gradually added to the pre-foam over a period of about 2 minutes, and the resulting foam suspension of resin emulsion having the cement powder suspended in the bubbles of the prefoam was poured into molds as described substantially in Example 1, and permitted to set therein for a period of about 10 minutes.

Following such an initial setting period, the molded foam construction in the form of a panel was then removed from the mold and the resulting panel permitted to set for about 28 days at room temperature or an accelerated cure could be performed at 200° F. in a dry steam atmosphere.

The resulting polymer-inorganic hybrid foam panel had a density of 60 lbs/cu.ft., high strength and was load supporting, having a compressive strength of about 1800 psi.

EXAMPLE 9

Substantially the same procedure as Example 8 was carried out except that 600 parts of Victor cement powder was suspended in 500 parts of the air whipped resin emulsion.

The resulting suspension of cement powder in the air whipped resin emulsion was permitted to initially set for a period of 20 minutes prior to demolding.

Following final set for the same period of time as in Example 10 the resulting polymer-inorganic hybrid foam panel had a density of about 30 pounds/cu. ft., and was very strong and tough.

EXAMPLE 10

Panels produced according to Examples 8 and 9 were tested by cycling 12 cycles of freeze-thaw temperatures ranging from −60° F. to 75° F., 24 hours at each extreme per cycle, and on alternate cycles the panels were dipped in water at 75° F. Following such testing procedure, it was observed that no cracks developed in the panels, and a nail could be driven through one inch panels as produced in Examples 5 and 6, one-quarter inch from the edge at −60° F. substantially without formation of cracks at the nail locations, or cracking out to the edges.

EXAMPLE 11

The following formulations for production of an air whipped resin emulsion containing suspended cement particles were provided according to the invention and procedure essentially as described in Example 1 above, except that compressed air was bubbled into the resin emulsion to provide the air whipped prefoam, and the respective formulations subjected to the initial setting times in the molds, as noted in Table B below:

TABLE B

| Air Whipped Resin Emulsions Containing Cement Powder | A | B | C | D | E | F | G |
|---|---|---|---|---|---|---|---|
| Solid 81-900 | 8.9 | 8.0 | 7.2 | 9.45 | 6.9 | 9.4 | 7.6 |
| Solid 6302 | 1.3 | 1.2 | 1.1 | 1.4 | 1.0 | 1.4 | 1.1 |
| TEA | 0.04 | 0.04 | 0.04 | 0.04 | 0.04 | | |
| T-4 | | | | | | 0.011 | 0.011 |
| Water | 47.6 | 42.6 | 38.5 | 50.6 | 36.8 | 50.6 | 40.4 |
| Victor Portland Cement (low sulfate gypsum-free) | 41.2 | 47.4 | 61.9 | 37.5 | 54.5 | | |
| Gypsum (green label 20 minute set) | | | | | | 37.5 | 50.0 |
| Initial Setting Time (min.) | 45 | 20 | 15 | 60 | 25 | 25 | 15 |

Solid 81-900, 6302, TEA and T-4 (see Table A above)

Following initial setting of the above respective formulations of Table B, the molded articles in the form of panels were finally set for a period of about 28 days for the cement formulations and 5 days for the gypsum formulations, at room temperature, to form polymer-inorganic foam construction panels according to the invention, having a density ranging from about 10 to about 60 pounds/cu.ft.

EXAMPLE 12

The procedure of Examples 2 and 4 was substantially repeated employing a butadiene-styrene emulsion in place of a polyvinyl acetate emulsion, the formulations, process conditions and results being set forth in Table C below.

TABLE C
HYBRID FOAM FORMULATIONS USING BUTADIENE-STYRENE EMULSION

| Panel Number | Liquid Phase | Solid Phase | Aeration Time | Foam Volume c.c. | Hybrid Foam Volume c.c. | Initial Set Time | Rockwell "R" Hardness | Compressive Strength PSI | Density lb/cu.ft. | Cell Uniformity |
|---|---|---|---|---|---|---|---|---|---|---|
| 3262 | 400cc Water 100cc 460 3cc T-1 2cc TEA | 600 gm. Victor gypsum-free Portland cement (Type I) | 1-½ min. | 2800cc | 1400 | 17 min. | 90 | 450 | 38.00 | Excellent |
| 3263 | 400cc Water 100cc 6302 3cc T-1 2cc TEA | 600 gm. Victor Portland cement | 1-½ min. | 2900cc | 1500 | 23 min. | 85 | 470 | 27.00 | Fair on surface. Good skin. |
| 3264 | 400cc Water 100cc 460 3cc T-4 | 700 gm. Gypsum | 1 min. | 2800cc | 2000 | 33 min. | 92 | 500 | 36.00 | Excellent |
| 3265 | 400cc Water 100cc 6302 3cc T-4 | 700 gm. Gypsum | 1 min. | 2900cc | 1700 | 25 min. | 84 | 400 | 25.5 | Excellent |

460 is Dow Latex 460, a butadiene-styrene emulsion.
6302 is Celanese Corp. 6302, a cross-linking essentially acrylic homopolymer.
Victor cement, T-1 and T-4 (See Table A above).
TEA (See Table A above).

Note from Table C above the low densities and mostly excellent cell uniformity of the hybrid foam panels produced according to the invention.

EXAMPLE 13

The procedure of Example 4 was substantially followed except employing a silicone emulsion in place of a polyvinyl acetate emulsion. The formulation, process conditions and results are set forth in Table D below.

TABLE D
SILICONE BASE HYBRID FOAM

| PANEL NUMBER | LIQUID PHASE | SOLID PHASE | AERATION TIME | VOLUME C.C. | FOAM VOLUME | SET TIME | ROCKWELL "R" HARDNESS | COMPRESSIVE STRENGTH PSI | DENSITY lb/cu.ft. | CELL UNIFORMITY |
|---|---|---|---|---|---|---|---|---|---|---|
| 3212 | 300cc Water 100cc Silicone Emulsion | 500 g. Gypsum | 13 Min. | 1700 | 1200cc | 20 Min. | 88 | 617 | 36.09 | Excellent |

The silicone emulsion was Stauffer Wacker SWS 655.

A 4 inches × 4 inches × 1 inch slab of the hybrid foam produced according to Table D held over a Fisher burner for 48 hours showed only small cracks on the flame side, and another slab held in an electric muffler at 700° F. for 8 hours showed no cracks.

EXAMPLE 14

A typical formulation for a highly fire resistant hybrid foam is as follows.

| Components | Parts by Weight |
|---|---|
| Vinyl Acetate Emulsion (DuPont Elveset 81-900) | 75 |
| Vinylidene Chloride Emulsion (Staley Chemical-Polidene 761) | 25 |
| Water | 400–500 |
| Triethanolamine | 1 |
| Thickener (carboxy methyl cellulose | 1 |
| Red Iron Oxide (Optional) | 1–20 |
| Carbon Powder | 1–20 |
| Portland Cement | 600 |

The resin emulsion containing the triethanol amine and thickener was air whipped as described above to substantially increase its volume to about 6–10 times the volume of the original emulsion, and the Portland cement with the carbon powder and red iron oxide mixed therein introduced into the resulting pre-foam and mixed therewith while the pre-foam was being vigorously agitated.

The resulting hybrid foam mixture was poured into a mold and permitted to set therein about 30 minutes, following which the molded hybrid foam composition was removed from the mold and permitted to set over a period of 17 days, or alternatively moist cured for 6 hours at 200° F.

A 12 inches × 12 inches panel, 1 inch thick, of the resulting hybrid foam composition was placed over a burner at a temperature of 1850° F. and was subjected to more than 2500 hours of continuous exposure to the fire without serious degradation of the exposed surface. It appears that in the initial burning period, the components in the surface of the hybrid foam composition, particularly the carbon powder and some unknown component of the Portland cement, react to form chemical substances of a nature which are highly infrared reflectant. Thus, after the initial burning the surface becomes infrared reflective and mirrors the flame away from the impinging surface. The unexposed opposite surface of the hybrid foam panel never exceeded 140° F. in temperature during this extended fire exposure test. Such hybrid foam composition is highly suitable for precasting fire shields to be applied around I-beams and other structural shapes used in skyscraper construction.

EXAMPLE 15

A hybrid foam product is produced according to the procedure of Example 2, but 10 parts by weight of iron oxide powder is added to the 600 grams of Victor cement prior to incorporation thereof into the prefoam.

The resulting hybrid foam has physical properties similar to that of the hybrid foam product of Example 2, but has a higher surface hardness, and the product has a reddish brick-like coloration.

EXAMPLE 16

A hybrid foam product is produced according to the procedure of Example 2, but 10 parts by weight of carbon powder is added to the 600 grams of Victor cement prior to incorporation thereof into the prefoam.

The resulting hybrid foam has physical properties similar to that of the hybrid foam product of Example 2, but has higher fire and temperature flame resistance.

EXAMPLE 17

A number of polymer-hybrid foam test specimens were prepared substantially according to the procedure of Example 2, but employing asphalt or bituminous (coal tar or petroleum) pitch emulsions in place of the $SRM_4$ polyvinyl acetate emulsion of Example 2, and the data for these tests are set forth in Table E below. The initial set time for each of these test specimens or panels is set forth in Table E. Following the initial set, each of the resulting foam products was subjected to a 6 hour moist cure at 200° F. In tests 3275, 3276, and 3277 the iron oxide, carbon powder and combination of iron oxide and carbon powder, respectively, were incorporated into the 600 grams of Portland cement prior to addition thereof to the prefoam of asphalt emulsion.

TABLE E

Typical Asphalt and Bituminous Pitches in Emulsion Form as Substituted for Synthetic Resin Emulsion for the Production of Hybrid Foam (Based on 600 G. Low Gypsum Portland Cement)

| Test Number | Natural Polymer Emulsion | Water,cc | Accelerator,cc* | Panel Density,lb./cu.ft. | Special Additives,g. | Set Time,min. | Comments |
|---|---|---|---|---|---|---|---|
| 3270 | 100 c.c. Douglas Oil(DOAC #1002 Asphalt Emulsion) | 400 | 1 | 45.2 | none | 8 | Lower volume & good hardness. |
| 3271 | 100 cc Flintkote Co. "Tred-Top" Asphalt Emulsion | 400 | .5 | 40.1 | none | 10 | Good volume hardness & fluidity. |
| 3272 | Same as 3271 | 400 | .25 | 38.2 | none | 16 | Same as 3271. |
| 3275 | Same as 3270 | 400 | .3 | 39.9 | 20 g Iron oxide | 10 | Harder & Red Color Fire Resistant. |
| 3276 | 100 cc Douglas Oil (DOAC #1034 Asphalt Emulsion) | 400 | .3 | 44.1 | 3 g Carbon Powder | 12 | Good Hard- Grey Color Fire Proof+ |
| 3277 | 100 cc Emulsified Asphalts, Inc. Sample "A" Anionic Asphalt Emulsion | 500 | .3 | 35.1 | 10 g Iron- oxide 10 g Carbon Powder. | 30 | Excellent Volume, low density Fire Proof+ |
| 3278 | 100 Emulsified Asphalts, Inc. Sample "E" Anionic Petroleum Pitch Emulsion | 500 | 1.0 | 35.6 | none | 40 | Good Separation, low density |
| 3279 | 100 Emulsified Asphalts, Inc. Sample "D" Anionic Petroleum Pitch Emulsion | 500 | 1* | 34.8 | none | 45 | Excellent Volume |

*TRIETHANOLAMINE.
FIRE PROOF + INDICATES FORMATION OF INFRA RED REFLECTANCE CHROMOPHORES IN SITU BY FIRE.

It is significant that in none of the formulations of the above examples was any wetting agent added during the process of producing the hybrid foams of the invention, and hence no wetting agent is present beyond any minor amount which may have been present in any commercially available emulsion, among those noted above, which may be employed as starting material in the present invention. It is also noted that a substantial amount of water is added to the resin emulsion, thereby further reducing the concentration of any wetting agent that may be present in the initial resin emulsion. As previously noted, past experience has shown that the presence of any substantial amount of surface active or wetting agent, whether initially present in the aqueous resin emulsion or added thereto, is to be avoided, since it tends to thin out or destroy the thick prefoam bubble wells, and hence provide insufficient support for the inorganic or cement particles. Accordingly, the polymer-inorganic hybrid foam product of this invention is substantially free of surface active agents.

From the foregoing, it is seen that the invention provides novel organic polymer-inorganic hybrid foams employing both Portland cement and gypsum, such hybrid foams having high strength, low density, high fire resistance and being thermally insulating. Such foam products are quicksetting and can be produced particularly at low cost, rendering the construction materials of the invention highly advantageous for production of wall, floor and roof panels, beams and other construction materials, particularly designed for production of low cost buildings and homes.

While I have described particular embodiments of the invention for purposes of illustration, it will be understood that various changes and modifications can be made therein within the spirit of the invention, and the invention accordingly is not to be taken as limited except by the scope of the appended claims.

I claim:

1. A polymer-inorganic cellular hybrid foam of low density, and which is load supporting, fire resistant, thermally insulating and has low thermal expansion, consisting essentially of a plastic phase matrix formed of unexpanded polymer particles selected from the group consisting of polyvinyl acetate, butadiene-styrene and silicone resins, and an inorganic phase formed of particles selected from the group consisting of Portland cement and gypsum, substantially uniformly distributed through said plastic phase, said inorganic phase being substantially free of sand, rock or aggregate, intersticial compounds or complexes being formed between said inorganic phase and said plastic phase, said hybrid foam having a density ranging from about 10 to about 80 pounds per cu. ft., said foam containing about 300 to about 1,000 parts of said inorganic phase and about 50 to about 100 parts of said polymer particles, by weight, said foam being substantially free of surface active agents.

2. A polymer-inorganic hybrid foam as defined in claim 1, the cells of said hybrid foam being highly uniform, said foam being self-skinning.

3. A polymer-inorganic hybrid foam as defined in claim 1, said hybrid foam having a density ranging from about 15 to about 45 pounds per cu.ft.

4. A polymer-inorganic hybrid foam as defined in claim 1, said foam having a compressive strength of from about 400 to about 2,000 psi, a Rockwell hardness from about 80 to about 125, and a K factor of thermal insulation of about 0.15 to about 0.5, said foam having low shrinkage and low thermal expansion.

5. A polymer-inorganic hybrid foam as defined in claim 1, said hybrid foam being reinforced with fiberglass roving.

6. A polymer-inorganic hybrid foam as defined in claim 1, said inorganic phase being Portland cement free of gypsum.

7. A polymer-inorganic hybrid foam as defined in claim 4, said inorganic phase being Portland cement free of gypsum.

8. A polymer-inorganic hybrid foam as defined in claim 1, said inorganic phase being gypsum and about 0 to about 25 percent of Portland cement by weight of total inorganics.

9. A polymer-inorganic hybrid foam as defined in claim 1, said polymer particles being polyvinyl acetate.

10. A polymer-inorganic hybrid foam as defined in claim 1, said polymer particles being polyvinyl acetate, and said inorganic phase being Portland cement free of gypsum.

11. A polymer-inorganic hybrid foam as defined in claim 9, said polymer particles additionally including polyvinyl alcohol.

12. A polymer-inorganic hybrid foam as defined in claim 9, said polymer particles additionally including vinyl acetate-acrylic copolymer.

13. A polymer-inorganic hybrid foam as defined in claim 1, said polymer particles being a mixture of about 75% polyvinyl acetate and about 25% polyvinylidene chloride, based on the polymer phase.

14. A polymer-inorganic hybrid foam as defined in claim 1, said foam additionally including iron oxide in an amount of about 1 to about 50 parts, to about 600 parts of said inorganic phase, by weight.

15. A polymer-inorganic hybrid foam as defined in claim 1, said foam additionally including carbon in an amount of about 1 to about 50 parts, to about 600 parts of said inorganic phase, by weight.

16. A polymer-inorganic hybrid foam as defined in claim 1, said foam additionally including iron oxide and carbon, each in an amount of about 1 to about 50 parts, to about 600 parts of said inorganic phase, by weight.

17. A polymer-inorganic hybrid foam as defined in claim 10, said foam additionally including iron oxide in an amount of about 1 to about 50 parts, to about 600 parts of said inorganic phase, by weight.

18. A polymer-inorganic hybrid foam as defined in claim 10, said foam additionally including carbon in an amount of about 1 to about 50 parts, to about 600 parts of said inorganic phase, by weight.

19. A polymer-inorganic hybrid foam as defined in claim 13, said foam additionally including iron oxide and carbon, each in an amount of about 1 to about 50 parts, to about 600 parts of said inorganic phase, by weight.

* * * * *